United States Patent Office 2,945,473
Patented July 19, 1960

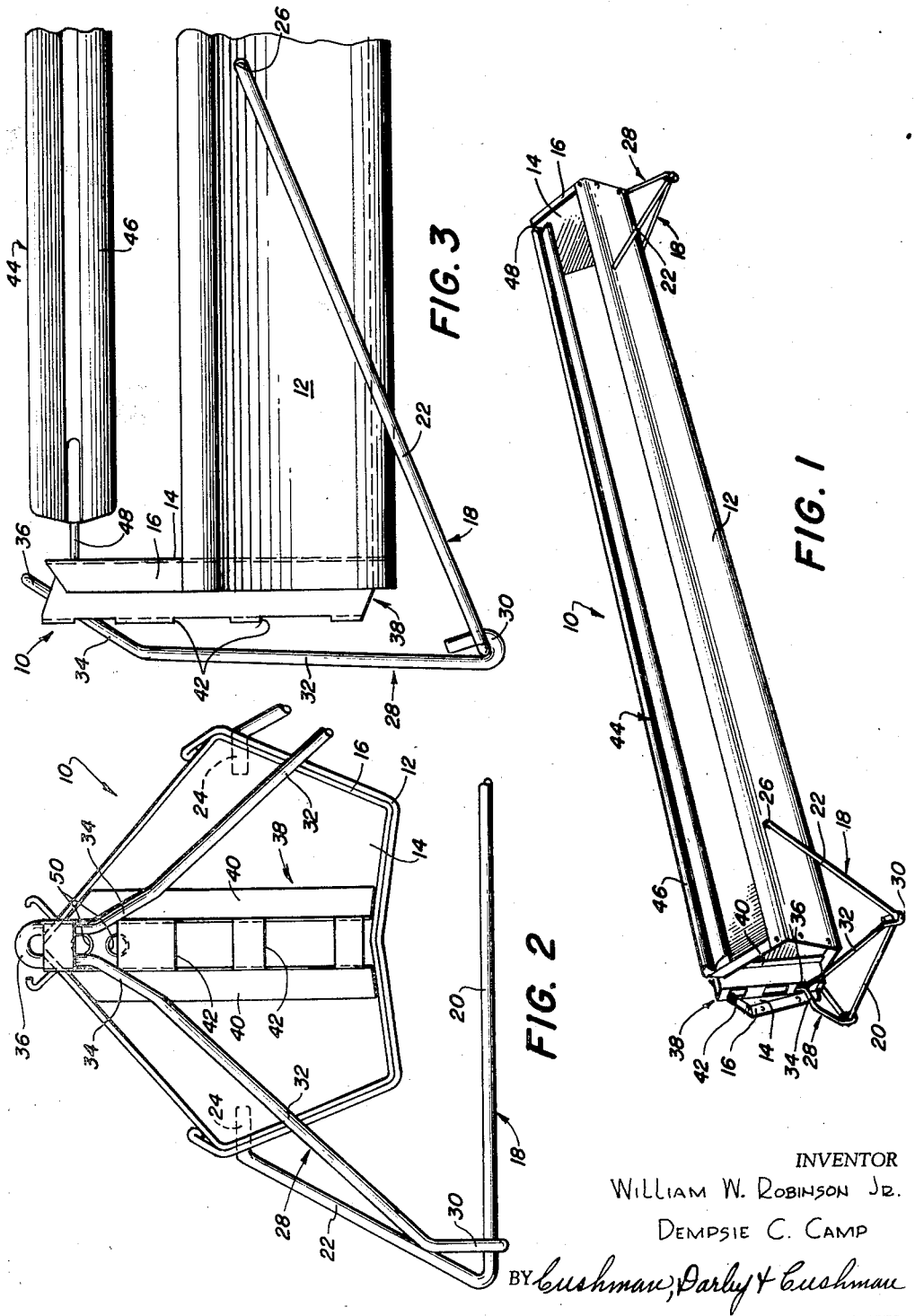

2,945,473

POULTRY FEEDING TROUGH WITH VERTICALLY ADJUSTABLE SUPPORTING LEG ASSEMBLIES

William W. Robinson, Jr., Forrest Park Drive, Signal Mountain, Tenn., and Dempsie C. Camp, Box 298, Dunlap, Tenn.

Filed Sept. 9, 1959, Ser. No. 838,866

8 Claims. (Cl. 119—61)

This invention relates to poultry feeders and more particularly to improved means for mounting a poultry feeding trough in different positions of vertical adjustment.

In modern poultry raising, it is preferable to present the feed to growing chicks in such a way that the feeding device is at all times disposed at about the level of the breast of the chicks. This arrangement presents the feed most conveniently to the chicks and reduces wastage to a minimum. Where the trough is too low, the chicks may readily jump therein and scratch around in the feed causing wastage and contamination. Of course, where the trough is too high it presents difficulties of access. Since chicks and other poultry grow quite rapidly, it is necessary to provide feeding devices which can be readily adjusted in height to maintain this optimum condition as the chicks get larger.

An object of the present invention is to provide a means for vertically adjustably mounting a feeding trough for poultry and the like which is positive in operation requiring only an easy manual manipulation and which is simple in construction and economical to manufacture.

Another object of the present invention is the provision of a trough-type poultry feeder having swingable leg assemblies adjacent both ends of the trough, such assemblies including pivotally interconnected support members and improved means for mounting the support members on the trough ends so that the trough may be selectively maintained in different positions of vertical adjustment.

These and other objects of the present invention will become more apparent during the course of the following detailed description and appended claims.

The invention may best be understood with reference to the accompanying drawings wherein an illustrative embodiment is shown.

In the drawings:

Figure 1 is a perspective view of a poultry feeding device embodying the principles of the present invention;

Figure 2 is an end view of the device; and

Figure 3 is a front elevational view of one end of the device.

Referring now more particularly to the drawings, there is shown in Figures 1–3 a poultry feeding device, generally indicated at 10, which embodies the principles of the present invention. The feeding device includes an elongated trough 12 which may be of any desirable cross-sectional configuration and, as shown, is of generally U-shaped cross-section, having upwardly diverging sides and an upwardly convex angular bottom. Desirably, the upper edges of the sides are turned inwardly and the extremities thereof are bent under so as to present a smooth edge to be contacted by the poultry. It will be understood that any particular configuration may be employed in the construction of the trough, the present configuration being illustrated merely to exemplify one embodiment of the present invention.

The present invention is more particularly concerned with the means for supporting the trough 12 in different positions of vertical adjustment so as to accommodate different size poultry throughout their growing cycle. To this end, a plate 14 encloses each end of the trough, each plate having a peripheral flange 16 generally conforming to the interior cross-section of the trough. The flanges 16 are suitably fixed to the trough ends by any appropriate means such as spot welding, rivets or the like.

The supporting means of the present invention adjacent each end of the trough comprises a first support or leg member generally indicated at 18 which is pivotally mounted on the trough for swinging movement about a transverse horizontal axis. The first leg member 18 preferably comprises an elongated rod or wire bent into a generally U-shaped configuration to form a central bight portion 20 having a pair of spaced legs 22 extending from opposite ends thereof. The extremity of each leg 22 is bent inwardly, as indicated at 24 in Figure 2, to engage within a registering aperture, indicated at 26 in Figure 3, formed in the trough sides at a position spaced inwardly from the associated end plate 14.

The mounting means at each end of the trough also includes a second support or leg member generally indicated at 28, which is pivotally interconnected with the first leg member and arranged to be locked to the associated end of the trough at any one of a plurality of vertically adjusted positions. Each leg member 28 is also preferably formed from an elongated rod or wire bent to provide a pair of transversely spaced free end portions indicated at 30 which are looped about the bight portion 20 of the associated first leg member as shown in Figure 3 to pivotally interconnect the two leg members. Each of the second members is also bent to provide inclined portions 32 which converge upwardly from the free ends 30. Extending at an angle from the plane of the inclined portions 32 in a direction inwardly toward the associated end plate 14 from each inclined portion 32 is a second inclined portion 34, such portions being interconnected by an inverted U-shaped locking tongue portion 36 disposed in the plane of the portions 34.

Mounted in fixed relation by any suitable means, such as welding, rivets, or the like, to each of the end plates 14, is a tongue receiving channel member, generally indicated at 38. The member 38 is preferably formed from sheet metal bent into an elongated channel configuration and having a pair of oppositely directed attaching flanges 40 which are fixed, as by welding, rivets or the like, in abutting relation to the exterior surface of the associated end plate 14. Formed in the bight portion of the channel is a plurality of vertically spaced openings 42 arranged to receive the tongue portion 36 of the associated leg member 28.

It will be understood that the feeding device may include the usual reel assembly 44. The reel assembly may be of any suitable construction and, as shown, includes a reel 46 having a pin 48 extending from each end thereof. Each pin is arranged to engage within one of a plurality of vertically spaced apertures 50 formed in the associated end plate 14.

In operation, the trough 12 of the feeding device of the present invention can be disposed in any one of a plurality of positions of vertical adjustment by selectively engaging the tongue portions 36 of the leg assembly adjacent each end of the trough within a selected one of the vertically spaced openings 42. It will be noted that the short inclined portions 34 of the second leg members 28 engage the walls of the channel members defining the opening and thereby support the weight of the trough in cooperation with the associated first leg member 18. When it is desired to adjust the height of the trough, the end of the same is supported manually and then the tongue portion 36 of the associated second leg member 28 is moved out of the associated aperture 42 and into the next lower aperture, so as to raise the adjacent end of the trough. Of course, this procedure is repeated at the opposite end of the trough to maintain the same in level condition. It will be noted that the engagement of the tongue within the aperture is self-wedging and the weight of the trough tends to increase this wedging action, thus decreasing the possibility that the tongue portion will move out of the aperture accidentally.

It can thus be seen that the height adjusting means of the present invention provides a sturdy but simple construction in which the adjustability is provided by members secured to the ends of the trough. In this way, adjustment can be readily obtained without the necessity of awkward blind manipulations under the trough. Moreover, the construction is devoid of any tabs struck from sheet metal which have a tendency to bend and break in operation. The channel member provided at the ends of the trough adds extra strength to the latter.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

We claim:

1. A poultry feeder comprising an elongated trough and means connected with said trough adjacent each end thereof for supporting the same in a plurality of positions of vertical adjustment, each of said supporting means comprising a first support member pivotally connected to said trough at a position spaced inwardly of the associated end for movement about a transverse horizontal axis, a second support member pivotally connected at its lower end to the outer end of said first member about a parallel horizontal axis for movement therewith in a generally vertical direction, said second member having an upwardly and inwardly extending element formed on the upper end thereof, and means on the associate end of said trough defining a plurality of vertically spaced openings for selectively receiving said element, the arrangement being such that said first and second members serve to support the trough in different positions of vertical adjustment as determined by the engagement of said elements within selected openings.

2. A poultry feeder as defined in claim 1 wherein said first members are U-shaped.

3. A poultry feeder as defined in claim 1 wherein said opening defining means comprises a vertically extending channel having a bight portion within which said openings are formed.

4. A poultry feeder comprising an elongated trough having plates enclosing opposite ends thereof, a pair of pivotally interconnected leg members adjacent each end of said trough, one member of each pair including a transversely extending bight portion having a pair of spaced legs extending from opposite ends thereof, the free ends of the legs of each of said one member being pivotally connected about a transverse horizontal axis to the trough at a position spaced inwardly from the associated end thereof, the other member of each pair including transversely spaced free ends pivotally connected to the bight portion of the associated one member and a centrally disposed upstanding locking tongue portion, and a tongue receiving channel fixed to each end plate, each of said channels having a plurality of vertically spaced openings formed therein for selectively receiving the associated locking tongue portion.

5. A poultry feeder as defined in claim 4 wherein said first and second members are made of bent rods.

6. A poultry feeder as defined in claim 5 wherein the extremities of the legs of each of said first members are bent inwardly and pivotally supported in aligned apertures formed in said trough.

7. A poultry feeder as defined in claim 5 wherein the extremities of the free ends of each of said second members are bent into loop formation to pivotally receive the bight portion of the associated second member.

8. A poultry feeder comprising an elongated trough and means connected with said trough adjacent each end thereof for supporting the same in a plurality of positions of vertical adjustment, each of said supporting means comprising a first pair of spaced legs having one of their ends pivotally connected to opposite sides of the said trough at a position spaced inwardly of the associated end for movement about a transverse horizontal axis, a second pair of legs connected at their lower ends to the opposite ends of said first legs, means on the associated end of said trough defining a plurality of vertically spaced openings, means interconnecting the upper ends of said second pair of legs for selectively engaging within said openings, said last-mentioned means being moveable toward and away from the pivotal axis of said first pair of legs so as to permit the same to be removed from and selectively engaged within said openings, the arrangement being such that said first and second pairs of legs serve to support the trough in different positions of vertical adjustment as determined by the engagement of said means within selected openings.

References Cited in the file of this patent
UNITED STATES PATENTS 2,875,007    Fox                  Feb. 24, 1959